US010742484B1

(12) United States Patent
Friedrichs et al.

(10) Patent No.: US 10,742,484 B1
(45) Date of Patent: Aug. 11, 2020

(54) GENERATING ACTION SUGGESTIONS BASED ON ANONYMIZED DATA FROM MULTIPLE INFORMATION TECHNOLOGY ENVIRONMENTS

(71) Applicant: Splunk Inc., San Francisco, CA (US)

(72) Inventors: Oliver Friedrichs, Woodside, CA (US); Atif Mahadik, Freemont, CA (US); Govind Salinas, Sunnyvale, CA (US); Sourabh Satish, Freemont, CA (US)

(73) Assignee: Splunk Inc., San Francisco, CA (US)

( * ) Notice: Subject to any disclaimer, the term of this patent is extended or adjusted under 35 U.S.C. 154(b) by 84 days.

(21) Appl. No.: 16/051,183

(22) Filed: Jul. 31, 2018

(51) Int. Cl.
*H04L 12/24* (2006.01)
*H04L 29/06* (2006.01)

(52) U.S. Cl.
CPC ...... *H04L 41/0631* (2013.01); *H04L 41/0654* (2013.01); *H04L 41/14* (2013.01); *H04L 41/22* (2013.01); *H04L 63/1416* (2013.01); *H04L 63/1441* (2013.01); *H04L 63/20* (2013.01)

(58) Field of Classification Search
CPC ............. H04L 41/0631; H04L 41/0654; H04L 63/1441; H04L 63/1416; H04L 41/14; H04L 41/22
See application file for complete search history.

(56) References Cited

U.S. PATENT DOCUMENTS

| 2014/0331320 A1* | 11/2014 | Satish ..................... G06F 21/56 726/23 |
| 2015/0244681 A1* | 8/2015 | Blumenfeld .......... H04L 9/0618 713/168 |
| 2016/0164907 A1* | 6/2016 | Satish .................. G06F 16/285 726/25 |
| 2016/0224804 A1* | 8/2016 | Carasso ............. G06F 16/2322 |
| 2016/0226731 A1* | 8/2016 | Maroulis ............... G06F 16/217 |
| 2018/0288007 A1* | 10/2018 | Poornachandran ......................... H04L 63/0421 |

* cited by examiner

*Primary Examiner* — Arvin Eskandarnia
*Assistant Examiner* — Chhian (Amy) Ling
(74) *Attorney, Agent, or Firm* — Nicholson De Vos Webster & Elliott LLP

(57) ABSTRACT

Described herein are systems, methods, and software to enhance the management of responses to incidents. In one example, a method of improving incident response comprises identifying an incident in an information technology (IT) environment associated with a first entity of a plurality of entities, and identifying action implementation information related to the incident. The method further anonymizes the action implementation information for the incident, and determines action suggestions based at least on the anonymized action implementation information.

28 Claims, 7 Drawing Sheets

US 10,742,484 B1

GENERATING ACTION SUGGESTIONS BASED ON ANONYMIZED DATA FROM MULTIPLE INFORMATION TECHNOLOGY ENVIRONMENTS

TECHNICAL BACKGROUND

An increasing number of threats exist in the modern computerized society. These threats may include viruses or other malware that attack a local computer of an end user, or sophisticated cyber-attacks to gather data from or otherwise infiltrate a complex information technology (IT) environment. Such IT environments include real and virtual computing devices executing various applications used to provide a variety of services, such as data routing and storage, cloud processing, web sites and services, amongst other possible services. To protect applications and services, various antivirus, encryption, and firewall tools may be used across an array of computing devices and operating systems, such as Linux® and Microsoft Windows®.

IT environments may employ a variety of computing components with different hardware and software configurations to provide the desired operation. These computing components may include end user computing devices, host computing devices, virtual machines, switches, routers, and the like. However, as more computing components are added to an IT environment, those same components become available as targets of potential security threats or incidents. The increasing number computing components in combination with limited administrative personnel and resources can make it difficult to manage the investigation and remediation of potential threats. Even with ample administrators or analyst users, it can be cumbersome to coordinate the investigation and remediation efforts.

DETAILED DESCRIPTION

Figure 1:
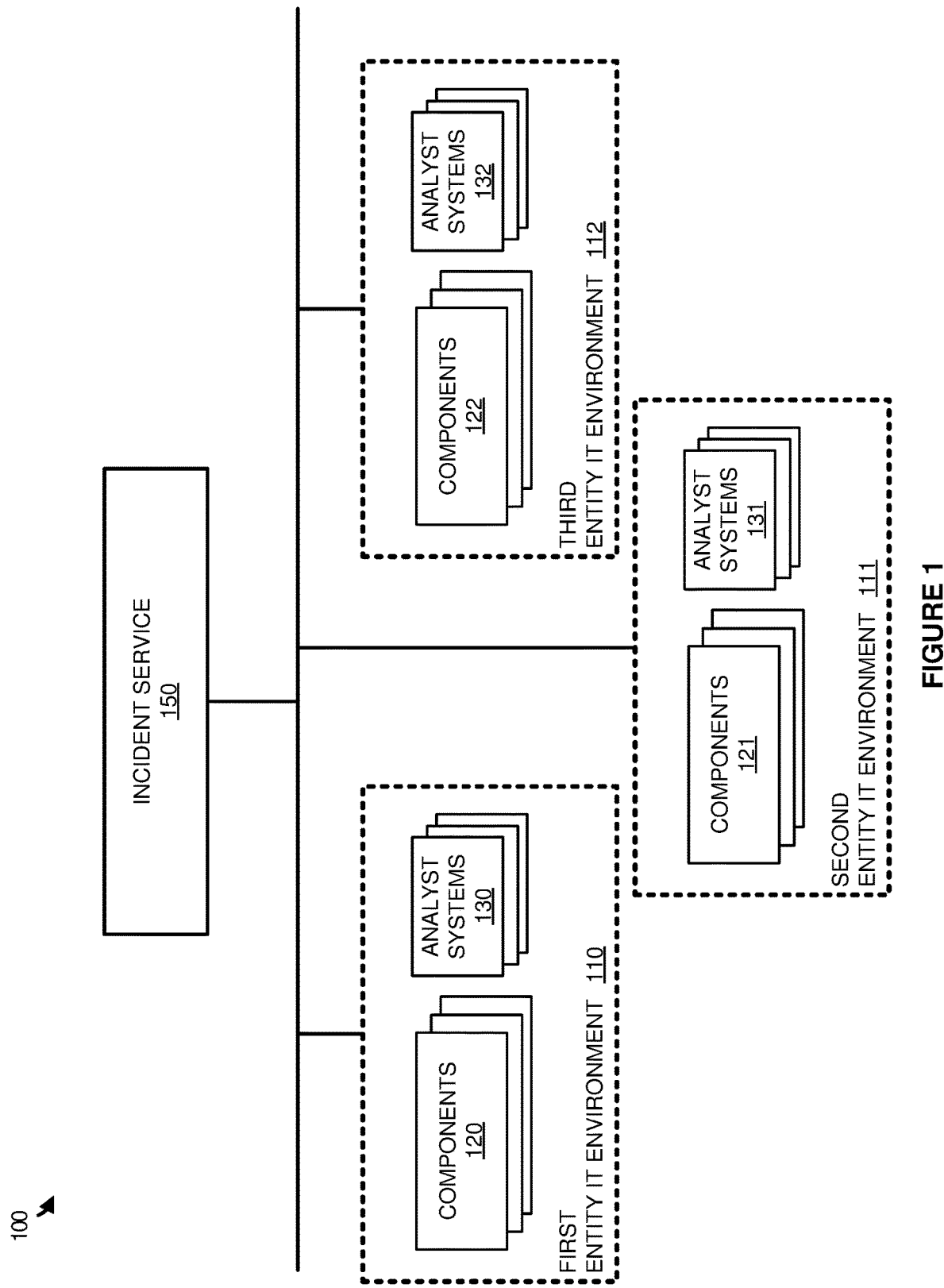
FIG. 1 illustrates a computing environment to improve incident response across multiple information technology environments according to an example.

FIG. 1 illustrates a computing environment 100 to improve incident response across multiple information technology (IT) environments according to an implementation. Computing environment 100 includes incident service 150, and entity IT environments 110-112. Entity IT environments 110-112 each include corresponding components 120-122 and analyst systems 130-132. An entity may comprise a company, organization, subdivision of a company, or some other similar entity, including combinations thereof. Although demonstrated as separate from entity IT environments 110-112, it should be understood that incident service 150 may operate wholly or partially distributed as part of the entity IT environments.

In operation, components 120-122 operate in entity environments 110-112 to provide various operations within the corresponding environment. These components may comprise physical computing systems, virtual machines or containers, routers, switches, virtual networking systems, firewalls, or some other similar component, including various combinations thereof. During the operation of components 120-122, analyst systems 130-132 are available to provide IT monitoring for incidents and implementation of actions for the incidents. These incidents may include or be associated with viruses, malware, spyware, denial of service attacks, phishing attacks, server crashes, device failures, power outages, unknown communications, or some other similar incident. In some implementations, incident service 150, which may operate remotely, distributed across each entity IT environment, or some combination thereof, may provide an analyst system of analyst systems 130-132 with a notification of an incident. Once notified, the analyst system may use one or more actions to investigate the incident, and initiate one or more response actions to mitigate, monitor, remove, or provide any other similar operation to remediate the incident.

As demonstrated in the present example, incident service 150 is provided to assist analyst systems that are operating in various entity IT environments. Incident service 150 may be capable of identifying sets of actions employed against particular incidents, and use that information to provide action recommendations to analyst systems in different entity environments. In some implementations, incident service 150 may identify an incident via an automated process or a user ticket, determine attributes associated with the incident, and determine actions suggestions that can be used in responding to the incident.

Figure 2:
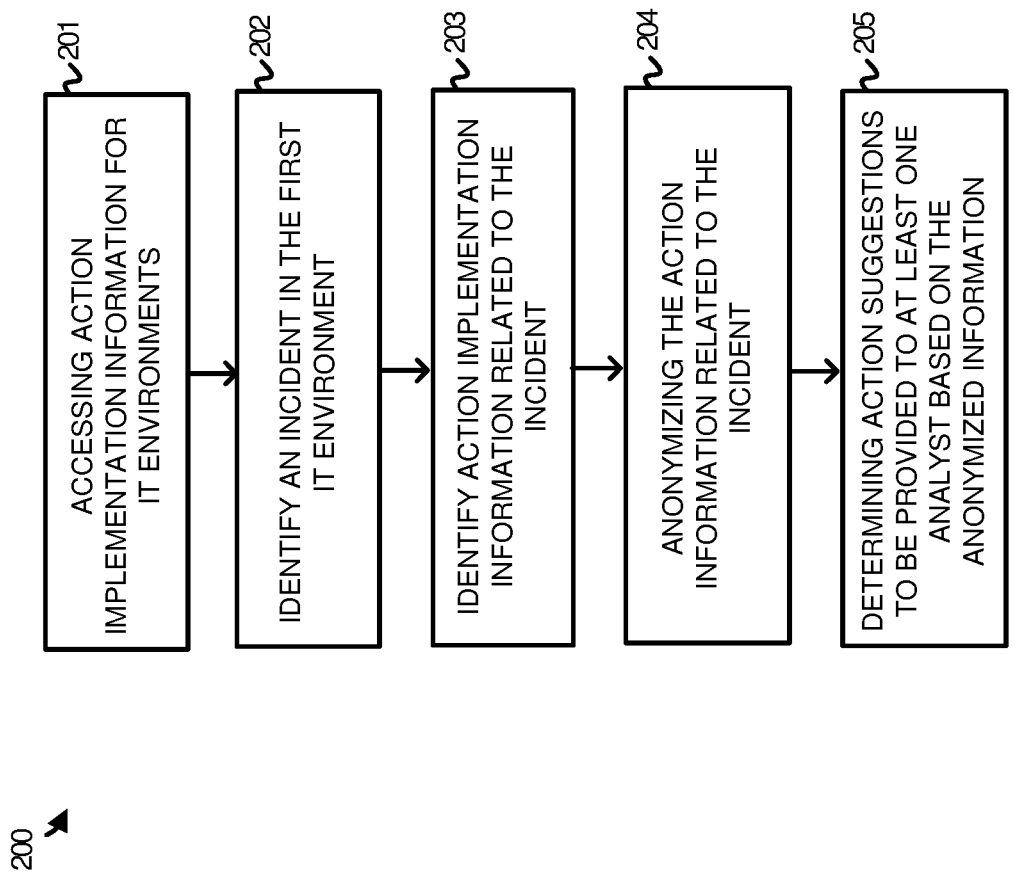
FIG. 2 illustrates an operation of an incident service according to an example.

FIG. 2 illustrates an operation 200 of an incident service according to an example. The operations of FIG. 2 are referenced parenthetically in the paragraphs that follow with reference to computing environment 100 of FIG. 1. While demonstrated in the example of FIG. 1 as operating remotely from each entity environment, it should be understood that incident service 150 may operate as a distributed service in some examples, and may operate at least partially in one or more of entity environments 110-112.

In operation, incident service 150 accesses (201) action implementation information for IT environments. This action implementation information may include information about the types of actions implemented in each entity IT environment, the order or sequencing in which actions are taken against particular incidents, the types of components in which the actions are implemented, or some other similar information regarding actions taken in each of the entity IT environments. In some examples, incident service 150 may access the action implementation information from another database or service, however, it should be understood that incident service 150 may maintain the information in one or more data structures or databases in some examples. As an example, incident service 150 may obtain the action implementation information in response to an action being implemented in an entity IT environment of entity IT environments 110-112, and may store the action implementation information in a database accessible for future action suggestions. In other implementations, the action implementation information may be obtained from analyst systems 130-132 at periodic intervals, when an incident response is completed, or at some other similar interval.

While accessing that action implementation information, incident service 150 identifies (202) an incident in a first entity IT environment of entity IT environments 110-112. In some implementations, the incident may be identified via a security information and event management (SIEM) service that is used to automate the identification of incidents within the entity IT environment. For example, if an unknown process were operating on a component of components 120, the SIEM service for entity IT environment 110 may identify the incident and provide information about the incident to incident service 150. This information may include information about the name of the unknown process, an internet protocol (IP) address associated with the incident, the source of the process, any credential or licensing information for the software, or some other similar information about the process. In some examples, in addition to or in place of the automated identification of incidents within an IT environment, entity network 130 may employ a "ticket" system, wherein users and analysts of the IT environment may report security incidents. As an example, when an email is received from an unknown party looking for personal information from an employee of the entity, the employee may report the email as an incident to incident service 150. Once reported, incident service 150 may identify any required attributes of the incident.

In some implementations, incident service 150 may obtain operational incident information from a monitoring and analytics service that is capable of identifying power failures, hardware failures, and other types of IT incidents outside of security threats. In particular, a monitoring and analytics service may provide health check operations on components within an environment and determine when an incident notification should be provided to incident service 150. For example, a monitoring and analytics service may determine when a power failure has caused one or more servers to become unresponsive. Once the power failure is identified, the monitoring and analytics service may provide incident service 150 with information about the power failure. This information may include information about the components that were affected, any backups available for the failure, or any other similar information about the incident.

After the incident is identified from the first entity, operation 200 identifies (203) a subset of the action implementation information related to the incident. As described herein, incident service 150 may access action implementation information that corresponds to actions taken in entity IT environments 110-112. In one implementation, incident service 150 may identify incident characteristics for the currently identified incident, such as the type of incident, wherein type of incident may include an unknown process, a virus, malware, spyware, a denial of service attack, a phishing attack, a server crash, a device failure, a power outage, unknown incoming or outgoing communications, or some other similar incident type associated with the incident. The incident type may be expressly provided via the user or SIEM system when the incident is reported or may be derived from attributes of the incident, such as IP addresses, process names, or some other similar attribute. The incident characteristics may further be identified based on the types of information sought by the incident, the components affected by the incident, the severity rating for the incident, or some other similar classification for the incident.

Once the incident characteristics are identified, incident service 150 may identify a subset of action implementation information that corresponds to the incident characteristics. In some implementations, the action implementation information may be stored with metadata or other values, permitting characteristics identified from the newly identified incident to be matched to those of incidents in the action implementation information. As an example, an incident may be identified in first entity IT environment 110 that corresponds to an unknown process executing in a component of components 120 of first entity environment 110. In response to identifying the incident, incident service 150 may identify action implementation information gathered from second entity IT environment 111 and third entity environment 112 that could assist in responding to the unknown process in first entity IT environment 110. This information may include one or more actions or series of actions that were taken against unknown processes, the successfulness rating allocated to the action or series of actions, the quantity that each of the actions were implemented, or any other similar information related to the implementation of actions in entity IP environments 111-112.

In addition to identifying the relevant action implementation information, incident service 150 further anonymizes (204) the action implementation information related to the incident. This anonymizing of the action information may include removing IP addresses from the actions, removing thresholds or criteria from the actions, removing asset (component) identifiers from the actions, or any other similar operation to anonymize the action implementation information. In some implementations, the anonymizing of the action implementation information may occur when another incident is identified in an IT environment, however, it should be understood that the anonymization may occur as the action implementation information is obtained from the IT environments. For example, as action implementation information is obtained from an IT environment, the action implementation information may be anonymized and stored in at least one database maintained by the incident service 150 or some other service. Once the subset of anonymized action implementation information is identified, incident service 150 determines (205) action suggestions to be provided to at least one analyst of the first entity IT environment based at least in part on the subset of action implementation information.

In at least one implementation, in determining the action suggestions, incident service 150 may determine the frequency that various actions were implemented, patterns in actions that are implemented against particular incident types, any successfulness rating attributed to an action or set of actions, or some other similar factor for determining action recommendations. Based on the factors, incident service 150 may generate one or determine one or more action suggestions to be provided to at least one analyst in the first entity IT environment. In one example, incident service 150 may determine a series of actions to be implemented based on tendencies from the other entities' IT environments, wherein a first action may lead into one or more additional actions. In some implementations, in providing the series of actions as the action suggestion, incident service 150 may generate a flow diagram indicating the types of actions that are implemented and the order of which the actions are implemented. This flow diagram may include user input portions that permit an analyst to provide input to complete the action. For example, an action in a series of actions may be used to block specific IP addresses. Accordingly, the analyst may be required to provide input of the required IP addresses, wherein the IP addresses from other IT environments may be removed as part of the anonymization process.

In some implementations, as the action implementation information is obtained from the various IT environments, incident service 150 may anonymize the data and store the anonymized action implementation information in a database for use with later identified incidents. For example, when a first action is implemented in an environment, information about the action may be provided to incident service 150, wherein incident service 150 may anonymize the action by removing entity specific information, and cache the anonymized action implementation information. Once another incident is identified that corresponds to the incident characteristics of the first action, the anonymized action implementation information may be used to determine action suggestions for the newly identified incident.

Figure 3:
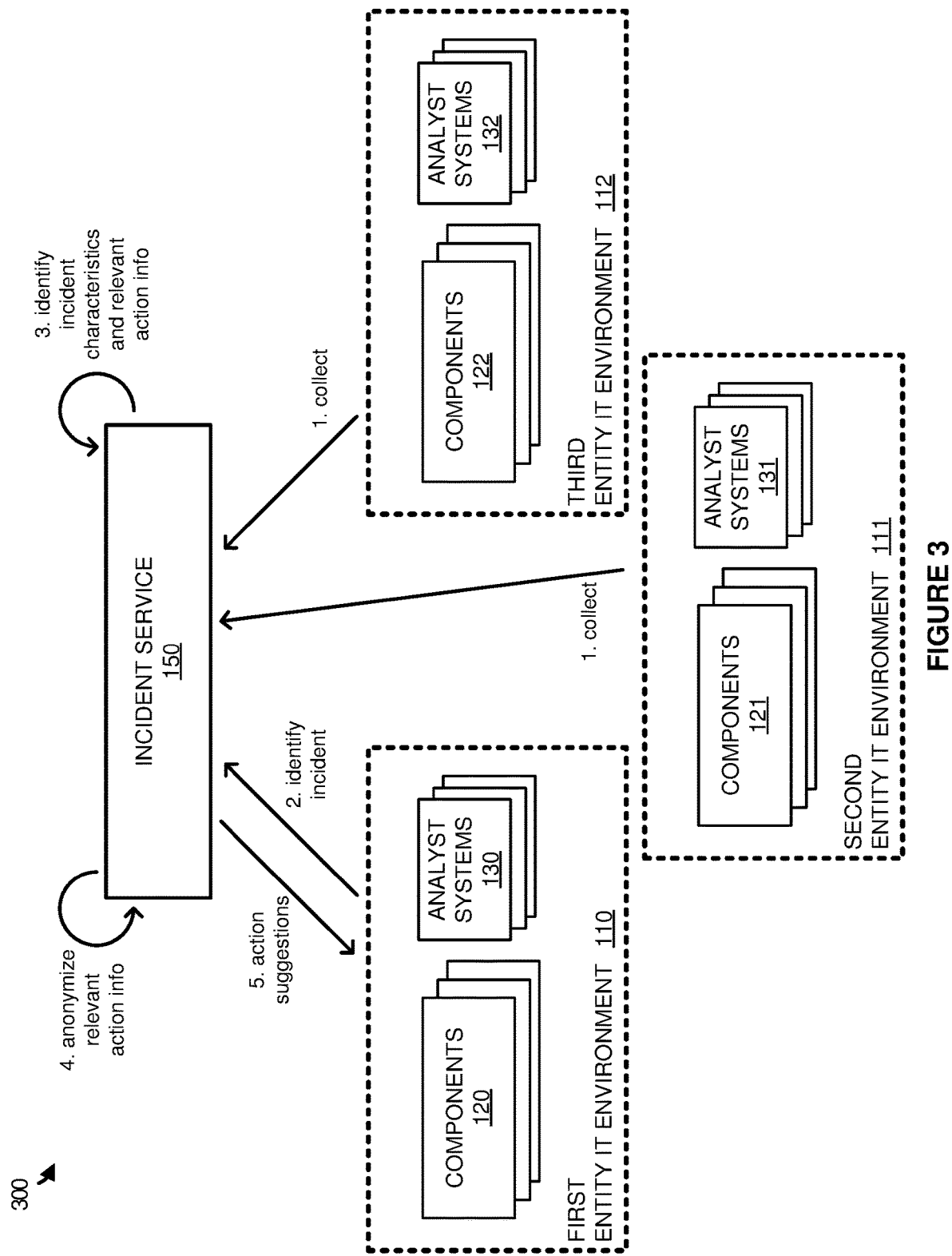
FIG. 3 illustrates an operational scenario of managing action suggestions across information technology environments according to an example.

FIG. 3 illustrates an operational scenario 300 of managing action suggestions across information technology environments according to an example. Operational scenario 300 includes systems and elements of computing environment 100 of FIG. 1.

As depicted, incident service 150 collects, at step 1, action response information from IT environments 111-112, wherein the action response information may include various information about IT actions taken in each of the environments. The information may include action descriptions, results of the actions, assets involved in the action, order of operations for the actions, or some other similar information. This information may be stored in one or more data structures, such as tables, linked lists, arrays, or some other similar data structure capable of managing the information from each of the environments. As the information is obtained, incident service 150 identifies, at step 2, an incident in at least one components of entity IT environment 110. The incident may be identified via an automated service (e.g. a SIEM) operating in entity IT environment 110 or may be identified via a user ticket from a user of entity IT environment 110.

In response to identifying the incident, incident service 150 identifies a incident characteristics and relevant action implementation information for the incident, at step 3. In some implementations, the incident characteristics may be user defined (e.g. user defining the incident type) or may be defined from the incident itself (asset/component identifier, IP addresses of interest, quantity of communications, data transfer characteristics, and the like). Once the incident type is identified, incident service 150 identifies action implementation information that corresponds to the incident characteristics. In at least one implementation, the incident implementation information obtained from entity IT environments 111-112 may be stored with metadata that indicates incident types that are relevant to each of the actions. For example, a first set of actions obtained from second entity IT environment 111 may correspond to a denial of service attack, while a second set of actions obtained from entity IT environment 112 may correspond to a malicious process executing in the environment. Thus, if the currently identified incident corresponded to a denial of service attack, then only the action implementation information from entity IT environment 111 would be identified to support a response to the incident.

In addition to identifying the subset of action implementation information for the particular incident, incident service 150 further anonymizes the relevant subset of the action implementation information, at step 4. In anonymizing the action implementation information, incident service 150 may identify attributes in the various actions that correspond to a particular entity, and remove the corresponding attributes, such that the entity may not be identified from the action. These attributes may include component identifiers (e.g. names and/or IP addresses) for components operating in the entity, IP addresses corresponding to IP block operations, analyst identifiers that generated the action, any proprietary thresholds or criteria that are implemented as part of an action, or some other similar attribute. In some implementations, when at least a portion of the information is identified in the actions, incident service 150 may indicate that user input is required by the next entity to implement the required action. For example, if an operation were used to block a first IP address for a first entity, incident service 150 may anonymize the IP address (remove the IP address from the action), and generate a user input portion permitting an analyst for a second entity or the same entity to replace the IP address with a required IP address.

Once the action implementation information is anonymized, incident service 150, at step 5, generates action suggestions to be provided to at least one analyst of first entity IT environment 110. In some implementations, in generating the action suggestions, incident service 150 may identify trends in the actions that were implemented across the entities. These trends include the actions that were most implemented across the various environment, the order of actions that were implemented across the various environment, the successfulness of operations across various environments, or some other similar operation. Based on the trends, incident service 150 may generate a sequence of flow diagram of actions that can be implemented by an analyst in first entity IT environment 110. In generating the flow of actions, incident service 150 may generate a text-based user interface for an analyst system to respond to the incident, may generate a block diagram demonstrating a flow of actions for the incident, or may generate any other similar interface to provide the action suggestions to a responding analyst. Once provided, the responding analyst may provide user input that indicates any missing information removed as part of the anonymization process. This information may include thresholds, criteria, IP addresses, or some other similar information. Additionally, the analyst may modify, add, remove, or provide any other operation with respect to the suggested actions prior to implementing the suggested actions.

In some implementation, the action implementation information is anonymized as required or when a new incident is identified. In other implementations, the action implementation information may be anonymized as it is obtained from the various entity IT environments. In particular, when an action is implemented in an IT environment, the action implementation information associated with the action may be provided to incident service 150 or some other similar service. Once provided, the action implementation information may be anonymized and stored in a database such that the information may be used in responding to future incidents. As an example, when a new incident is identified, anonymized action implementation information that corresponds to the new incident may be identified and used in determining action suggestions for the incident.

Figure 4:
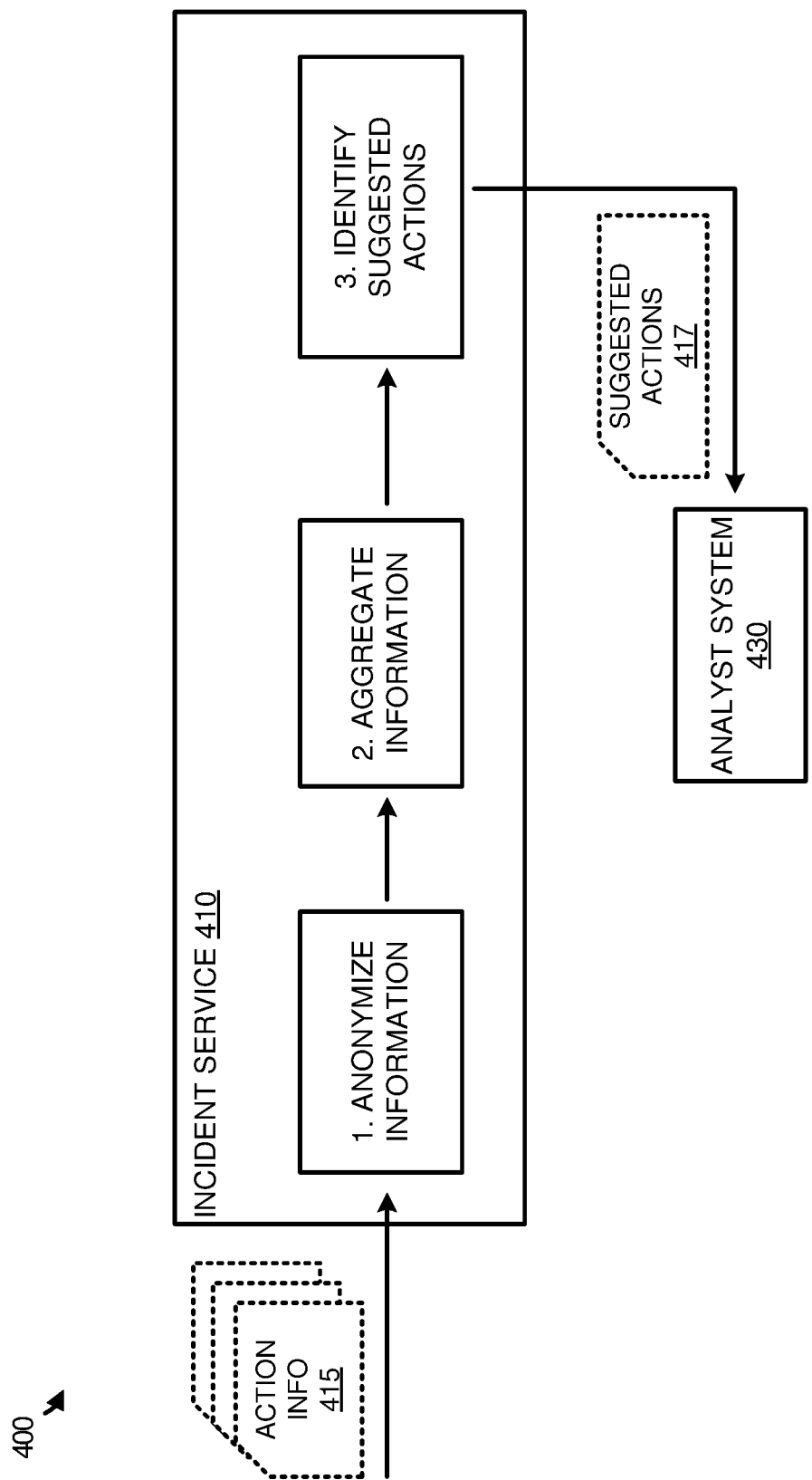
FIG. 4 illustrates an operational scenario of generating action suggestions according to an example.

FIG. 4 illustrates an operational scenario 400 of generating action suggestions according to an implementation. Operational scenario 400 includes incident service 410, action information 415 (representative of action implementation information), and analyst system 430.

In operation, incident service 410 identifies action information 415 in response to an incident identified in an IT environment. Once action information 415 is identified, either from a locally managed database or an externally managed database, incident service 410 may anonymize action information 415, at step 1. Once anonymized, incident service 410 aggregates action information 415, at step 2, such that information from multiple entities and analysts may be combined based on similarities of the actions. In at least one implementation, incident service 410 may determine trends in the sequencing of actions provided by analysts in the various entities, the quantities that each action was selected, or some other similar information. After aggregating the information, incident service 410, determines or identifies suggested actions 417 to be provided to analyst system 430, at step 3.

In at least one implementation, incident service 410 may determine which of the actions were used most often, the order of actions that were used most often, the success rate of the actions or series of actions, or some other similar information. After the suggested actions are identified, incident service 410 may provide the suggested actions to the analyst system, wherein the suggested actions may assist an analyst associated with analyst system 430 in responding to the incident. In some implementation, suggested actions 417 may include one or more actions that could be used in responding to a current incident, wherein the one or more actions may be provided as a single action or as a flow of multiple actions that can be implemented in sequence. In at least one example, in determining the action suggestions, incident service 410 may process various factors including trends in the combinations of actions that are taken, the successfulness of the various actions, the quantity of entities using the same actions, or some other similar factor. These factors may be compared against criteria to determine which of the actions or series of actions should be provided to a responding analyst or analyst system. For example, a score may be generated for actions that have been identified from the various entities, wherein the score may be generated based on one or more of the aforementioned factors. Once the scores are generated, the scores may be compared to criteria to determine which of the actions should be provided to a responding analyst.

Figure 5A:
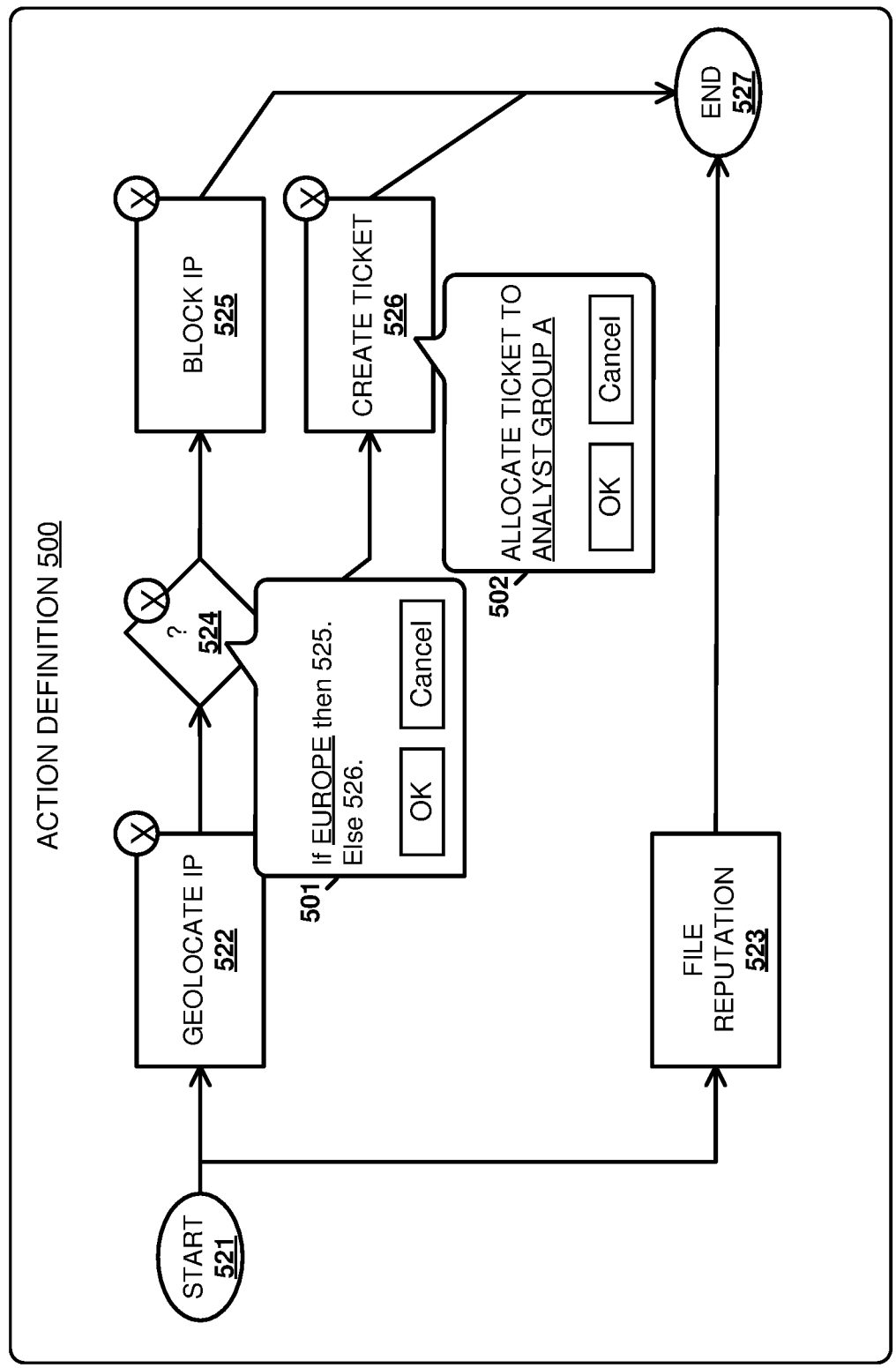
FIGS. 5A and 5B illustrate an action definition and an anonymized action definition according to an example.
Figure 5B:
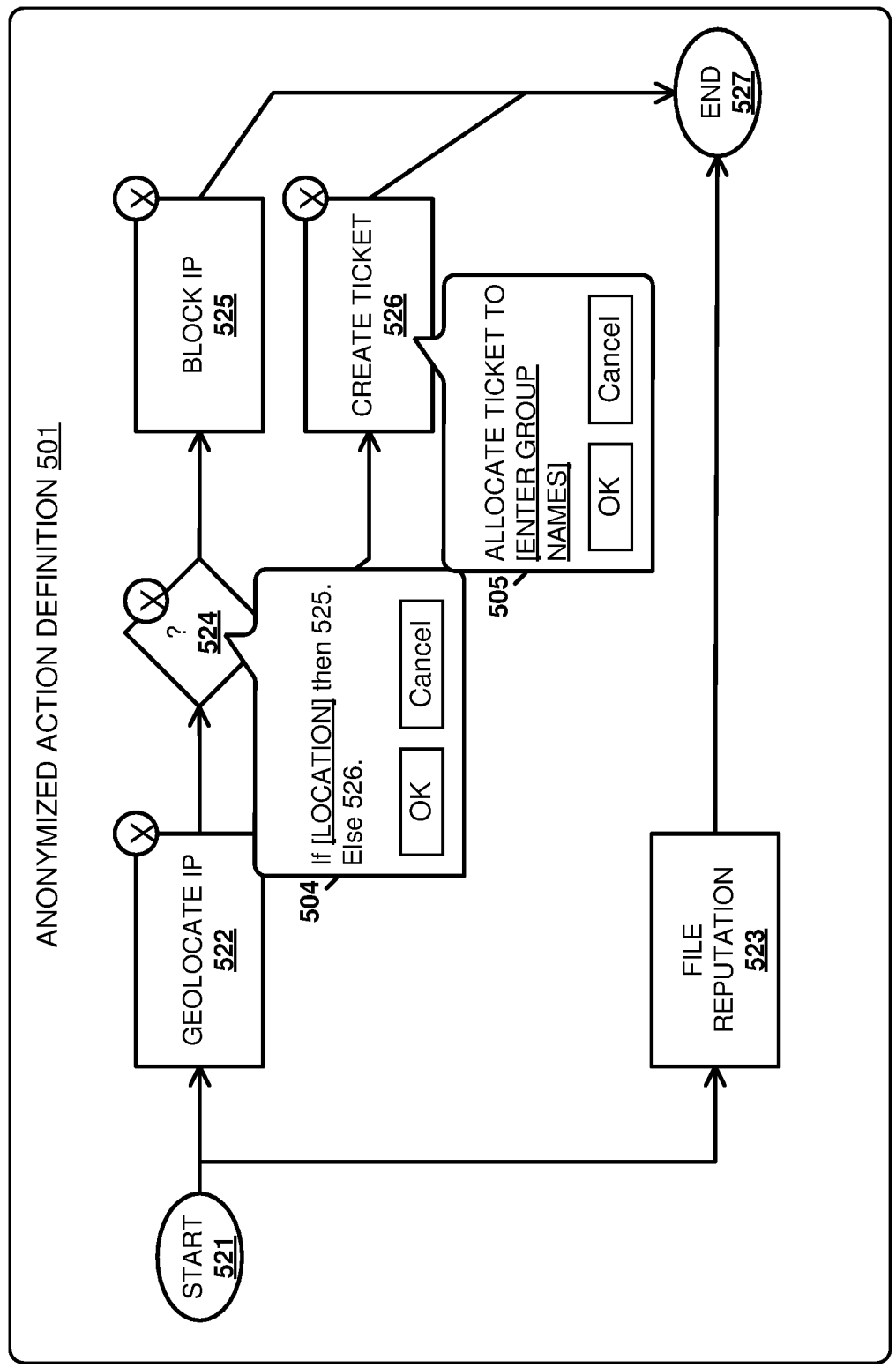

FIGS. 5A and 5B illustrate an action definition and an anonymized action definition according to an example. FIG. 5A provides an action definition 500 that corresponds to actions implemented in a first entity environment. In particular, FIG. 5A includes entity specific or sensitive data that may be improper to share with other entities. FIG. 5B, in contrast, provides anonymized action definition 501 that anonymizes the entity specific or sensitive data provided for in action definition 500.

Referring first to FIG. 5A, action definition 500 corresponds to a user interface definition for actions to be implemented in an IT environment by an analyst for the environment. In particular, action definition 500 corresponds to an action that can be taken against an unknown communication with an unknown file. Here, after start block 521, action definition 500 performs geolocate IP 522 that determines a geographic location for the requesting IP address and file reputation 523 that provides information of whether the file should be considered malicious. In some implementations, blocks of action definition 500 may correspond to code that is capable of querying databases and websites, both internal and external, to identify the required information for action definition 500. Thus, using the example of the block for file reputation 523, file reputation 523 may correspond to code (python, C++, or some other code type, including combinations thereof) capable of obtaining the required information from file reputation service.

Here, once the file reputation 523 is determined for the file associated with the communication, that portion of action process proceeds to end 527. In contrast, once geolocate IP 522 is executed, action definition 500 proceeds to an option block represented as "?" 524, wherein operation 501 is executed to determine if the IP address corresponds to a European address. If the IP address corresponds to a European address, then the process moves to block 525, while if the IP address corresponds to any other geolocation, then the process will move to block 526. As depicted, when an IP address corresponds to Europe, then action definition 500 blocks the IP address and proceeds to end 527. However, if the IP address corresponds to a geolocation that is outside of Europe, action definition process to block 526, where operation 502 allocates a ticket to "ANALYST GROUP A" to resolve the incident. Once allocated to the analyst group, action definition proceeds to end 527.

Once action definition 500 is generated, an analyst may implement the action definition, wherein the code for the corresponding blocks may be executed against a corresponding incident. Further, action implementation information related to action definition 500 may be accessed by an incident service, such as incident service 150, wherein the incident service itself may maintain the action implementation information or may rely on one or more other services to maintain the required information. As the information is maintained, analysts for other entities may use the action implementation information to determine actions to be implemented against the same or similar incident.

Turning now to FIG. 5B, FIG. 5B illustrates anonymized action definition 501 that is derived from action definition 500 of FIG. 5A. In the particular example of anonymized action definition 501, new operation 504-505 are presented that have removed entity specific or sensitive data from action definition 500. Here, operation 504 removes the location of "Europe" from the original definition, and replaces the action definition with "[LOCATION]" that permits another analyst for the same or a different entity to implement a similar set of actions, but with their own location definition. Additionally, in operation 505 "ANALYST GROUP A" is replaced with "[ENTER GROUP NAMES]" permitting the analyst to specify a particular group of one or more analysts to respond to a particular incident.

By removing any of the entity specific or sensitive data from an action, an incident service may provide action suggestions to other analysts operating in the same entity and may further provide suggestions analysts across multiple entities. For example, an incident in a first entity may require a determination of whether the incident originated from a first geolocation. In contrast, a second incident for a second entity may require a determination of whether the incident originated from a different geographic location. Similarly, while an analyst for a first entity may refer a ticket to a first analyst group, a second entity may refer a ticket to a second analyst group.

Although demonstrated in the example of FIGS. 5A and 5B as anonymizing location criteria and analyst groups, it should be understood that a variety of information may be anonymized by an incident service. This information may include, but is not limited to, identifiers for analysts implementing the action or actions, identifiers for components or assets, threshold values, or any user defined criteria values. In at least one implementation, the incident service or the service managing the action implementation information may maintain at least one data structure that can be used to inspect and identify information to be anonymized in each of the actions. For example, the service may identify an action to block a particular IP address and determine that the IP address should be removed. Once removed, the incident service may generate a user interface that permits another analyst to provide input indicating a desired IP address for the operation.

Figure 6:
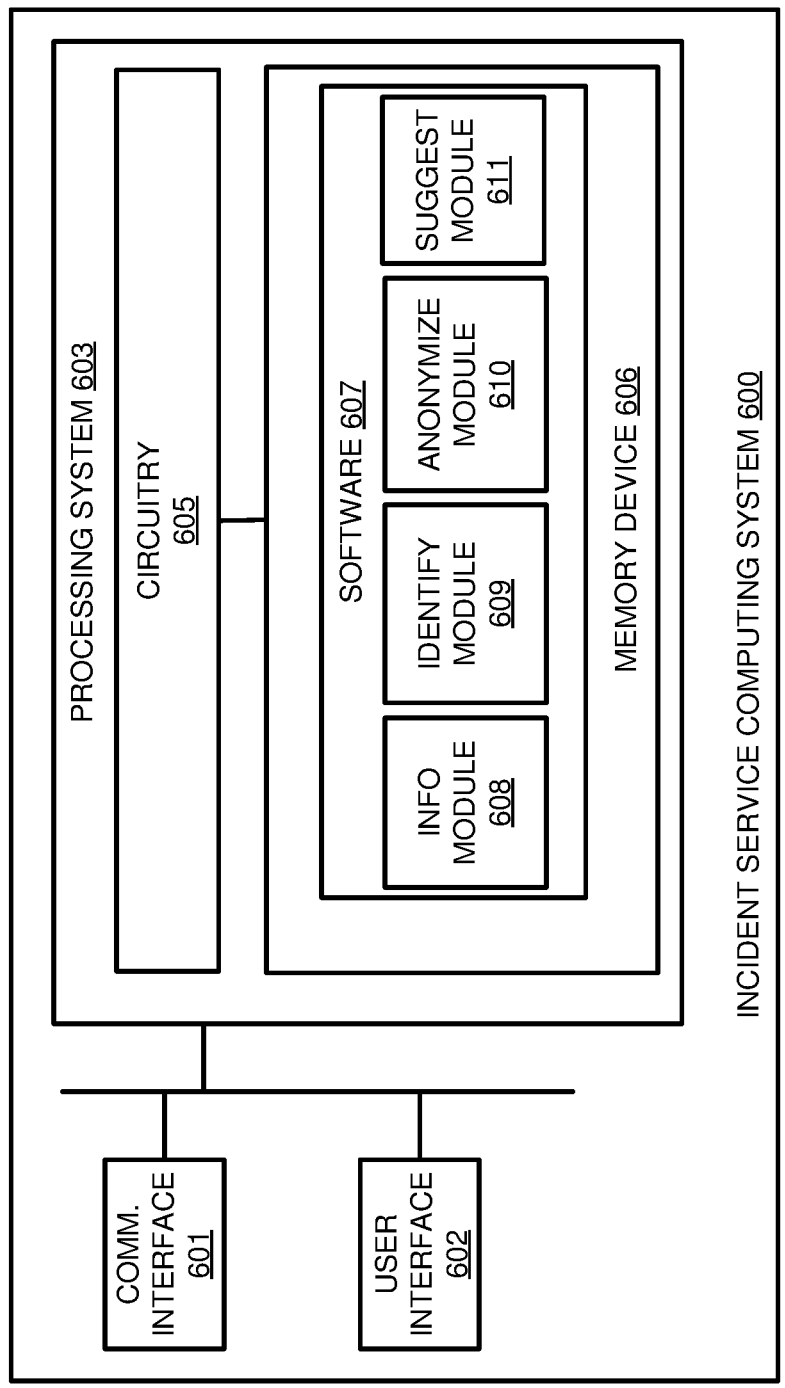
FIG. 6 illustrates an incident service computing system to manage action suggestions across multiple information technology environments according to an example.

FIG. 6 illustrates an incident service computing system 600 according to an implementation. Computing system 600 is representative of any computing system or systems with which the various operational architectures, processes, scenarios, and sequences disclosed herein for an incident service may be implemented. Computing system 600 is an example of incident service 150 from FIG. 1 and incident service 410 of FIG. 4, although other examples may exist. Computing system 600 comprises communication interface 601, user interface 602, and processing system 603. Processing system 603 is linked to communication interface 601 and user interface 602. Processing system 603 includes processing circuitry 605 and memory device 706 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In at least one implementation, communication interface 601 may be used to communicate analyst consoles or systems from multiple entities and may further communicate with components within the entity networks to identify incident information.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples. In some implementations, user interface 602 may operate as an analyst system to provide information about incidents to at least one analyst.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device, but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes information (info) module 608, identify module 609, anonymize module 610, and suggest module 611, although any number of software modules may provide a similar operation. Operating software 607 may further include an operating system, utilities, drivers, network interfaces, applications, or some other type of software. When executed by processing circuitry 605, operating software 607 directs processing system 603 to operate computing system 600 as described herein.

In at least one implementation, information module 608 directs processing system 603 to access incident response information obtained from multiple entities. In some examples, information module 608 may maintain the action implementation information from the various entities, wherein information module 608 may communicate with analyst systems and/or components of the various computing environments to obtain the required information. In other examples, information module 608 may rely on another service to maintain the incident response information, and may access the data of at least one database using an application programming interface (API) or some other similar functions. In addition to accessing the data, identify module 609 identifies an incident in an entity computing environment. This incident may be identified via automated process, such as a SIEM service, or may be identified from a user report or user ticket. Further, anonymize module 610 directs processing system 603 to identify a relevant subset of the incident response information that corresponds to the incident, wherein the subset of the incident response information may share characteristics with the identified incident. For example, if the incident corresponds to an unknown process, then related incident response information may comprise incident response information to previously identified unknown processes. As the relevant response information is identified, anonymize module 610 may further anonymize the information to remove any entity specific information, and instead indicate that the information will be required by the analyst prior to implementation.

In addition to anonymizing the incident response information for the incident, suggest module 611 further determines action suggestions that can be used in responding the currently identified incident based on the anonymized incident response information. In determining the action suggestions, suggestion module 611 may identify trends in the actions that are implemented within the various entity computing environments. These trends may include the quantity of times that particular actions are implemented, order of operation information for actions, the success ratings for each action or series of actions (identified from the environments or from users in the environment), or some other similar information. As an example, a first set of entities may frequently implement a first action followed by a second action, while a second set of entities may frequently implement the second action followed by a third action. Consequently, incident service computing system 600 may identify that the actions should aggregated and generate a suggestion to implement the first, second, and third action.

In at least one example, in generating the action suggestions, computing system 600 may provide, either locally via user interface 602 or to an external analyst system via communication interface 601, an interface or display that indicates the action suggestions. The display may comprise a flow diagram demonstrating an order of actions as the action suggestions, and may further indicate information required from the analyst prior to implementing the various actions. In particular, the user interface may include portions for the analyst to provide IP addresses, thresholds, criteria, or some other similar information that may be specific to the entity environment.

Returning to the elements of FIG. 1, analyst systems 130-132 and incident service 150 may each comprise communication interfaces, network interfaces, processing systems, computer systems, microprocessors, storage systems, storage media, or some other processing devices or software systems, and can be distributed among multiple devices. Examples of analyst systems 130-132 and incident service 150 can include software such as an operating system, logs, databases, utilities, drivers, networking software, and other software stored on a computer-readable medium. Analyst systems 130-132 and incident service 150 may comprise, in some examples, one or more server computing systems, desktop computing systems, laptop computing systems, or any other computing system, including combinations thereof.

Components 120-122, which may include physical computing systems (host computing systems, user devices, and the like), virtual computing systems, such as virtual machines and containers, routers, switches, firewalls, and other similar computing elements.

Communication between analyst systems 130-132, incident service 150, and components 120-122 may use metal, glass, optical, air, space, or some other material as the transport media. Communication between analyst systems 130-132, incident service 150, and components 120-122 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between 130-132, incident service 150, and components 120-122 may use direct links or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented method performed by an incident service, the method comprising:
    obtaining, from a plurality of analyst systems running in a plurality of information technology (IT) environments, action implementation data including information about past executions of actions by the plurality of analyst systems within the plurality of IT environments, wherein each of the plurality of IT environments is associated with a respective entity of a plurality of entities;
    generating anonymized action implementation data by removing at least one entity-specific data item from the action implementation data;
    obtaining, by the incident service, data identifying an incident in one of the plurality of IT environments;
    identifying an incident characteristic associated with the incident;
    identifying a subset of the anonymized action implementation data relevant to the incident based on the incident characteristic;
    identifying an action suggestion for the incident, wherein the action suggestion is based on the subset of the anonymized action implementation data relevant to the incident; and
    providing the action suggestion to a user of the one of the plurality of IT environments.

2. The method of claim 1, wherein the action implementation data further comprises a success rating for the actions, an incident severity level, an associated asset type, or an associated asset identifier.

3. The method of claim 1, wherein the anonymized action implementation data comprises no entity specific data.

4. The method of claim 1, wherein the anonymized action implementation data comprises no addressing values.

5. The method of claim 1, wherein the anonymized action implementation data comprises no threshold values.

6. The method of claim 1, wherein the anonymized action implementation data comprises no asset identifiers.

7. The method of claim 1, wherein identifying the action suggestion for the incident comprises:
    identifying a plurality of actions implemented by one or more other entities of the plurality of entities;
    determining a number of instances in which each action in the plurality of actions was implemented in the plurality of IT environments; and
    determining the action suggestion based on the number of instances in which each of the plurality of actions were implemented.

8. The method of claim 1 further comprising causing display of a user interface, wherein the user interface comprises an indication of information required for implementing the action suggestion.

9. The method of claim 8, wherein the indication of information comprises an indication for interne protocol addressing information, asset identifier information, or threshold information.

10. The method of claim 1 further comprising causing display of a user interface, wherein the user interface comprises a flow diagram demonstrating an order of actions as the action suggestion.

11. The method of claim 1, wherein the action suggestion comprises an order of execution suggestion for a plurality of actions.

12. The method of claim 1, wherein the action implementation data comprises sequencing information for implementing remediation actions.

13. The method of claim 1, wherein the action implementation data comprises sequencing information for implementing a remediation action, wherein the method further comprises identifying a sequencing trend from the sequencing information, and wherein determining the action suggestion further comprises determining the action suggestion based on the subset of the anonymized action implementation data relevant to the incident and the sequencing trend.

14. The method of claim 1, wherein the action implementation data comprises sequencing information for implementing a remediation action, wherein the method further comprises identifying a sequencing trend from the sequencing information, wherein determining the action suggestion further comprises determining the action suggestion for display based on the subset of the anonymized action implementation data relevant to the incident and the sequencing trends, and wherein the method further comprises generating a display, wherein the display indicates a flow diagram demonstrating an order of actions as the action suggestion.

15. A system comprising:
a processor;
a non-transitory computer readable storage medium storing instructions which, when executed by the processor, cause the processor to:
obtain, from a plurality of analyst systems running in a plurality of information technology (IT) environments, action implementation data including information about past executions of actions by the plurality of analyst systems within the plurality of IT environments, wherein each of the plurality of IT environments is associated with a respective entity of a plurality of entities;
generate anonymized action implementation data by removing at least one entity-specific data item from the action implementation data;
obtain data identifying an incident in one of the plurality of IT environments;
identify an incident characteristic associated with the incident;
identify a subset of the anonymized action implementation data relevant to the incident based on the incident characteristic; and
identify an action suggestion for the incident, wherein the action suggestion is based on the subset of the anonymized action implementation data relevant to the incident; and
provide the action suggestion to a user of the one of the plurality of IT environments.

16. The system of claim 15, wherein the action implementation data further comprises a success rating for the actions, an incident severity level, an associated asset type, or an associated asset identifier.

17. The system of claim 15, wherein the anonymized action implementation data comprises no entity specific data.

18. The system of claim 15, wherein the anonymized action implementation data comprises no addressing values.

19. The system of claim 15, wherein the anonymized action implementation data comprises no threshold values.

20. The system of claim 15, wherein the anonymized action implementation data comprises no asset identifiers.

21. The system of claim 15, wherein the instructions, when executed by the processor, further cause the processor to cause display of a user interface, wherein the user interface comprises an indication of required information for implementing the action suggestion, and wherein the indication of required information comprises an indication for internet protocol addressing information, asset identifier information, or threshold information.

22. A non-transitory computer readable storage medium storing instructions which, when executed by a processor, cause the processor to perform operations comprising:
obtaining, from a plurality of analyst systems running in a plurality of information technology (IT) environments, action implementation data including information about past executions of actions by the plurality of analyst systems within the plurality of IT environments, wherein each of the plurality of IT environments is associated with a respective entity of a plurality of entities;
generating anonymized action implementation data by removing at least one entity-specific data item from the action implementation data;
obtaining data identifying an incident in one of the plurality of IT environments;
identifying an incident characteristic associated with the incident;
identifying a subset of the anonymized action implementation data relevant to the incident based on the incident characteristic;
identifying an action suggestion for the incident, wherein the action suggestion is based on the subset of the anonymized action implementation data relevant to the incident; and
causing display of a user interface, wherein the user interface comprises a flow diagram demonstrating an order of actions as the action suggestion.

23. The non-transitory computer readable storage medium of claim 22, wherein the action implementation data further comprises a success rating for the actions, an incident severity level, an associated asset type, or an associated asset identifier.

24. The non-transitory computer readable storage medium of claim 22, wherein the instructions further cause the processor to perform operations comprising:
maintaining the action implementation data.

25. The non-transitory computer readable storage medium of claim 22, wherein the action implementation data comprises sequencing information associated with implementing a remediation actions.

26. The non-transitory computer readable storage medium of claim 22, wherein the anonymized action implementation data comprises no entity specific data.

27. The non-transitory computer readable storage medium of claim 22, wherein the anonymized action implementation data comprises no addressing values or threshold values.

28. The non-transitory computer readable storage medium of claim 22, wherein the user interface comprises an indication of information required for implementing the action suggestion.

* * * * *